United States Patent [19]
Tanaka et al.

[11] Patent Number: 5,762,508
[45] Date of Patent: Jun. 9, 1998

[54] RELAY DEVICE BETWEEN RELATIVE ROTATING MEMBERS

[75] Inventors: Hiraku Tanaka; Satoshi Ishikawa; Nobuhiko Suzuki; Yasutaka Nagaoka; Hidehiro Ichikawa; Takuji Kinoshita, all of Shizuoka-ken, Japan

[73] Assignee: Yazaki Corporation, Tokyo, Japan

[21] Appl. No.: 755,453

[22] Filed: Nov. 22, 1996

[30] Foreign Application Priority Data

Nov. 24, 1995 [JP] Japan ................................. 7-305724

[51] Int. Cl.⁶ .................................................. H01R 35/04
[52] U.S. Cl. .................................................. 439/164; 439/15
[58] Field of Search ................................. 439/164, 15

[56] References Cited

U.S. PATENT DOCUMENTS

| | | |
|---|---|---|
| 4,657,326 | 4/1987 | Zeller et al. |
| 4,824,396 | 4/1989 | Sasaki et al. ......................... 439/15 |
| 4,928,901 | 5/1990 | Bannai et al. ........................ 439/15 |
| 4,936,782 | 6/1990 | Bannai et al. ........................ 439/15 |
| 5,238,419 | 8/1993 | Roeder et al. ...................... 439/164 |
| 5,657,940 | 8/1997 | Ishikawa et al. .................... 439/164 |

FOREIGN PATENT DOCUMENTS

| | | |
|---|---|---|
| 1-170980 | 12/1989 | Japan . |
| 2-41150 | 9/1990 | Japan . |
| 6-54696 | 7/1994 | Japan . |

*Primary Examiner*—Gary F. Paumen
*Attorney, Agent, or Firm*—Finnegan, Henderson, Farabow, Garrett & Dunner, L.L.P.

[57] ABSTRACT

A relay device 10 between relative rotating members has a flexible flat cable 13 wound in a spiral shape and arranged in a ring space K between sleeve-shaped members (an inside cylindrical portion, an outside cylindrical portion) 11a, 12a relatively rotating on inner and outer sides. The sleeve-shaped members 11a, 12a are electrically connected to each other through the flexible flat cable 13. The flexible flat cable 13 is constructed such that at least one end portion (an inner circumferential end portion, an outer circumferential end portion) 13a, 13b of the flexible flat cable is held in one of the sleeve-shaped members 11a, 12a through a holding member (an inner circumferential end holding portion, an outer circumferential end portion) 13g, 13h and a direction of the flexible flat cable is changed outward from one of the sleeve-shaped members 11a, 12a through a bent portion 13e, 13f bent at a predetermined angle. The holding member 13g, 13h is fixedly arranged in the flexible flat cable 13 near its center from the bent portion 13e, 13f.

3 Claims, 5 Drawing Sheets

RELAY DEVICE BETWEEN RELATIVE ROTATING MEMBERS

BACKGROUND OF THE INVENTION

1. Field of the Invention

This invention relates to a relay device between relative rotating members in which the relatively rotating members are electrically connected to each other through a cable.

2. Description of Related Art

For example, a conventional relay device between relative rotating members is shown in Japanese Patent Publication (KOKOKU) No. 6-54696.

In this relay device between the relative rotating members, an inner circumferential end holding portion and an outer circumferential end holding portion are formed in a bent portion of a cable. Accordingly, the relay device attains a state in which the pressure of a high pressure resin at an insertion molding time is left in the bent portion. Further, force is applied to the cable by a relative rotation between an inside cylindrical portion and an outside cylindrical portion so that this force is also applied to each bent portion. Therefore, there is a fear that the cable is cut in the bent portion.

SUMMARY OF THE INVENTION

Therefore, an object of this invention is to provide a relay device between relative rotating members in which there is no fear of cutting a bent portion of a flexible flat cable by preventing force from being applied to the bent portion.

To achieve the above object, this invention provides a relay device comprising an inside sleeve-shaped member and an outside sleeve-shaped member, the inside and outside sleeve-shaped members being rotatable relative to each other, a flexible flat cable for electrically connecting the inside sleeve-shaped member with the outside sleeve-shaped member. The flexible flat cable has a longitudinal direction and is wound in a spiral shape and arranged in an annular space defined between the inside sleeve-shaped member and the outside sleeve-shaped member. A holding member is in at least either one of the inside and outside sleeve-shaped members, and the holding member is capable of holding at least one end portion of the flexible flat cable in the longitudinal direction. The flexible flat cable is bent at a bending portion having a predetermined angle with respect to the longitudinal direction so as to extend outward from one of the inside and outside sleeve-shaped members, and the member is fixedly arranged on the flexible flat cable closer to a center portion thereof in the longitudinal direction from the bending portion.

One of the inside and outside sleeve-shaped members has a nipping-supporting portion for nipping and holding overlapping portions of the flexible flat cable.

One of the inside and outside sleeve-shaped members has a guide member for holding one of the overlapping portion constituting the bending portion, thereby guiding bending of the bending portion.

In the invention constructed as above, the holding member is arranged in a position near a central side from the bent portion in the flexible flat cable. Therefore, when force is applied to the flexible flat cable by a relative rotation between the inside sleeve-shaped member and the outside sleeve-shaped member, this force can be held in the portion near the central side from the bent portion. Accordingly, it is possible to prevent force from being applied to the bent portion so that a cutting fear in the bent portion can be dissolved.

When the sleeve-shaped members have the nipping-supporting portion for nipping and holding the mutual opposite portions of the bent portion in the flexible flat cable such that the mutual opposite portions approach each other, the bent portion can be stably held such that the bent portion is resiliently flexed. Further, the bent portion can be easily moved with respect to the nipping-supporting portion even when a displacement caused by a more or less backlash is transmitted from a holding member side to the bent portion. Accordingly, it is possible to prevent force from being applied to the bent portion. Further, the bent portion can be also easily moved in a force applying direction when force is applied from a portion on an end tip side from the bent portion. Accordingly, it is possible to prevent the force from being applied to this bent portion.

Further, when the relay device has the guide member for holding a portion of the bent portion prior to bending in the flexible flat cable on the side of a side wall of each of the sleeve-shaped members, a proximate portion of the bent portion can be stably held in a clearance portion between the guide member and the side wall of each of the sleeve-shaped members. Furthermore, when a displacement caused by a more or less backlash is transmitted from a holding member side to the bent portion, the portion prior to bending can be easily moved along the side wall of each of the sleeve-shaped members. Accordingly, it is possible to prevent force from being applied to the bent portion. When force is applied from a portion on an end tip side from the bent portion, a portion after bending, i.e., the bent portion can be curvedly moved in an applying direction of this force. Accordingly, it is possible to prevent the force from being applied to the bent portion.

DESCRIPTION OF THE PREFERRED EMBODIMENTS

Figure 1:
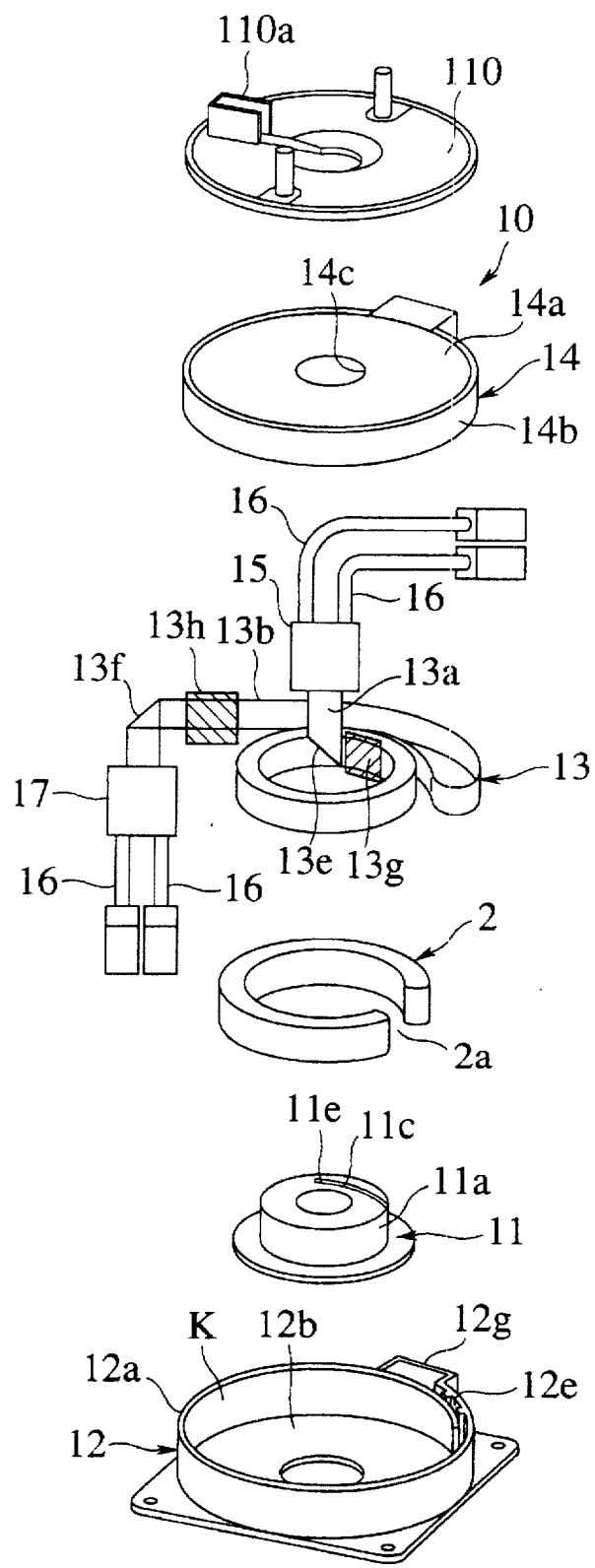
FIG. 1 is an exploded perspective view of a relay device between relative rotating members shown as a first embodiment form of this invention.

The preferred embodiments of this invention will next be described with reference to FIGS. 1 to 9.

A first embodiment form will first be explained with reference to FIGS. 1 to 3. A relay device 10 between relative rotating members has a rotating body (a first rotating body) 11, a fixing body (a second rotating body) 12, a cable (a flexible flat cable) 13 and a C-shaped moving body 2. The rotating body 11 has an inside cylindrical portion (an inside sleeve-shaped member) 11a. The fixing body 12 has an outside cylindrical portion (an outside sleeve-shaped member) 12a surrounding the inside cylindrical portion 11a at a predetermined interval. The cable 13 is stored into a ring space K between the inside cylindrical portion 11a and the outside cylindrical portion 12a in a state in which the cable 13 is wound along this space K in a spiral shape. An inner circumferential end portion 13a of the cable 13 is held in the inside cylindrical portion 11a. An outer circumferential end portion 13b of the cable 13 is held in the outside cylindrical portion 12a. The moving body 2 is movably arranged along the above space K. The moving body 2 inverts the cable 13 in its opening portion 2a.

A holder portion 11b for holding an inner circumferential end holding portion 13c of the cable 13 described later is formed in the above rotating body 11.

A cover member 14 is arranged in the above fixing body 12 such that the cover member 14 covers an upper side of the space K and a peripheral portion of the outside cylindrical portion 12a. This cover member 14 is constructed by an upper cover 14a for covering the upper side of the space K and a cylindrical portion 14b for surrounding the peripheral portion of the outside cylindrical portion 12a such that no cover member 14 is relatively rotated with respect to the fixing body 12. An opening portion 14c is formed in a central portion of the upper cover 14a. A lower cover 12b for covering a lower side of the space K is also formed in the fixing body 12 such that the lower cover 12b is integrated with the outside cylindrical portion 12a. Further, a holder portion 12c for holding an outer circumferential end holding portion 13d of the cable 13 described later is formed in the outside cylindrical portion 12a.

An external introducing cover 110 for introducing the cable 13 to the exterior is rotatably arranged on an upper side of the cover member 14. This external introducing cover 110 is connected to the inside cylindrical portion 11a through the opening portion 14c of the cover member 14 and is rotated together with the inside cylindrical portion 11a. A connector holder portion 110a for holding an inside connector 15 of the cable 13 described later is formed in this external introducing cover 110.

An inner circumferential end holding portion 13g is formed in the inner circumferential end portion 13a of the cable 13 by fixing a near portion of a bent portion bent in a perpendicular direction by resin. This inner circumferential end holding portion 13g is formed by filling a peripheral portion of the bent portion with a high pressure resin and solidifying this high pressure resin by insertion molding. The inner circumferential end holding portion 13g is inserted into the holder portion 11b of the inside cylindrical portion 11a and is held in this inside cylindrical portion 11a. An end tip portion of the inner circumferential end portion 13a is connected to an external cable 16 through the inside connector 15.

Further, an outer circumferential end holding portion 13h is formed in the outer circumferential end portion 13b of the cable 13 by fixing a near portion of a bent portion bent in a perpendicular direction by resin. This outer circumferential end holding portion 13h is formed by filling a peripheral portion of the bent portion with a high pressure resin and solidifying this high pressure resin by insertion molding. The outer circumferential end holding portion 13h is inserted into the holder portion 12c of the outside cylindrical portion 12a and is held in this outside cylindrical portion 12a. An end tip portion of the outer circumferential end portion 13b is connected to the external cable 16 through an outside connector 17.

For example, the above rotating body 11 is connected onto a steering wheel side in a handle portion of an automobile and the fixing body 12 is fixed onto a steering column side.

In this embodiment, the inner circumferential end holding portion (a holding member) 13g is formed in a position near a central side from the bent portion 13e of the inner circumferential end portion 13a in the cable (flexible flat cable) 13. The outer circumferential end holding portion (a holding member) 13h is formed in a position near a central side from the bent portion 13f of the outer circumferential end portion 13b in this cable 13.

The above bent portions 13e and 13f are perpendicularly bent through a directional line of 45 degrees and directions of the inner circumferential end portion 13a and the outer circumferential end portion 13b are respectively changed outward from the inside cylindrical portion 11a and the outside cylindrical portion 12a.

Figure 2:
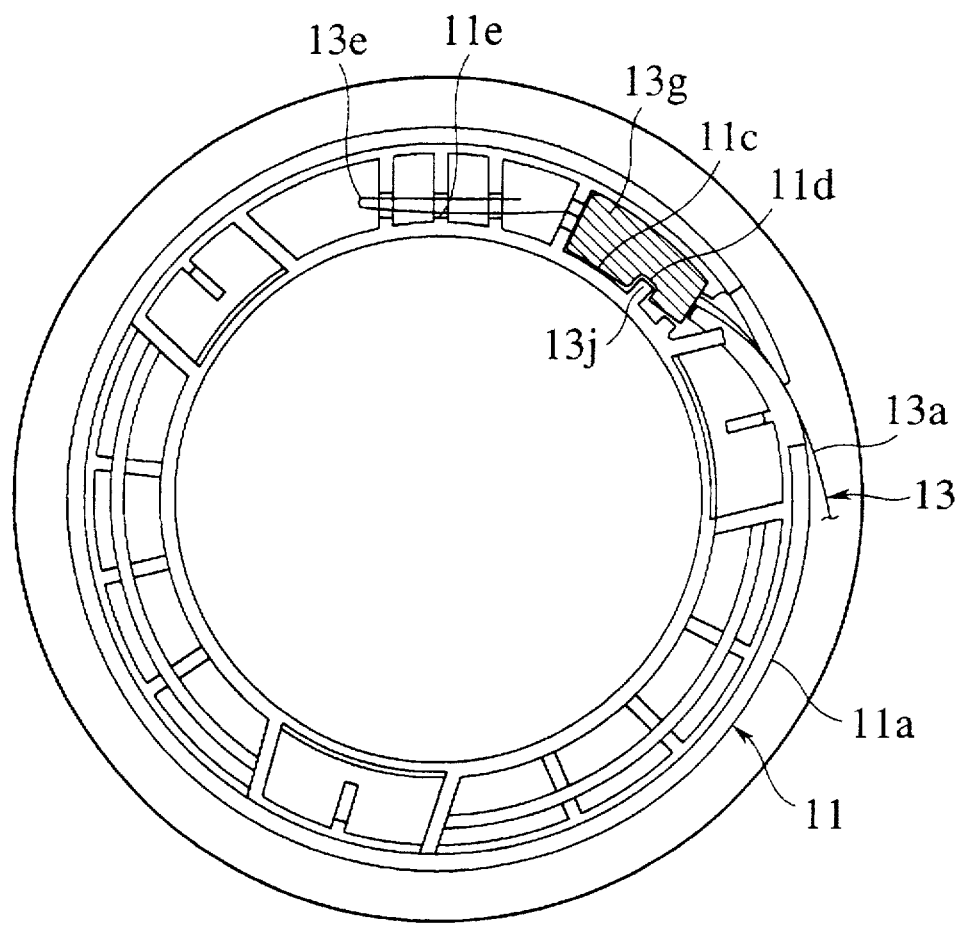
FIG. 2 is a plan view showing an inside cylindrical portion of the relay device between the relative rotating members.
Figure 3:
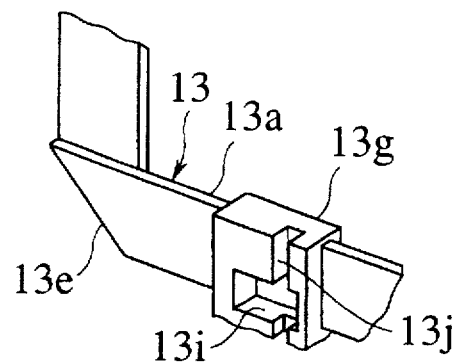
FIG. 3 is a main perspective view showing an inner circumferential end holding portion of the relay device between the relative rotating members.

As shown in FIGS. 1 to 3, the inner circumferential end holding portion 13g is formed by resin and attains a fixing state by insertion-molding in a portion near a central side from the bent portion 13e in the cable 13. As shown in FIG. 3, a hole 13i reaching the cable 13 is formed in this inner circumferential end holding portion 13g. This hole 13i is a standard for judging whether the inner circumferential end holding portion 13g is molded in a normal position of the cable 13 or not. Namely, for example, a mark is formed in the cable 13 and the cable 13 passes through an examination if this mark is in conformity with the position of an edge of the hole 13i. Otherwise, the cable 13 passes through the examination if a specific lead wire among plural thinly seen lead wires of the cable 13 is in conformity with the position of the edge of the hole 13i. Further, an engaging groove 13j is formed in the inner circumferential end holding portion 13g and is fitted to an engaging projecting stripe 11d of a holder portion 11c described later.

As shown in FIG. 2, the holding portion 11c for holding the inner circumferential end holding portion 13g is formed in the inside cylindrical portion (an inside sleeve-shaped member) 11a. This holder portion 11c holds the inner circumferential end holding portion 13g by inserting this inner circumferential end holding portion 13g in a direction perpendicular to a paper face of FIG. 2. The holder portion 11c is approximately formed in the same shape as the inner circumferential end holding portion 13g so as not to cause any backlash. The engaging projecting stripe 11d is formed in the holder portion 11c and is fitted into the engaging groove 13j of the inner circumferential end holding portion 13g. The engaging projecting stripe 11d and the engaging groove 13j are formed to prevent the inner circumferential end holding portion 13g from being reversely inserted into the holding portion 11c.

A nipping-supporting portion lie for nipping and supporting the bent portion 13e of the cable 13 is formed in the inside cylindrical portion 11a in a position adjacent to the holder portion 11c. This nipping-supporting portion 11e is formed in a slit shape in portions of three plates and holds mutual opposite portions of the bent portion 13e in the cable 13 by resiliently flexing these mutual opposite portions in an approaching direction. As shown in FIG. 1, an end tip side portion of the bent portion 13e in the cable 13 is fixed to a connector holder portion 110a of the external introducing cover 110 through the inside connector 15.

In the relay device 10 between relative rotating members constructed as above, the inner circumferential end holding portion 13g and the outer circumferential end holding portion 13h are respectively located in positions near a central side from the bent portions 13e and 13f in the cable 13. Therefore, when force is applied to the cable 13 by a relative rotation between the inside cylindrical portion 11a and the outside cylindrical portion 12a, this force can be held by portions near the central side from the bent portions 13e and 13f. Accordingly, it is possible to prevent force from being applied to the bent portions 13e and 13f. Thus, a cutting fear in the bent portions 13e and 13f can be dissolved.

The nipping-supporting portion 11e is formed in the inside cylindrical portion 11a and nips and holds the mutual opposite portions of the bent portion 13e in the cable 13 such that these mutual opposite portions approach each other. Accordingly, the bent portion 13e can be stably held such that the bent portion 13e is resiliently flexed. Further, the bent portion 13e can be easily moved with respect to the nipping-supporting portion 11e even when a displacement caused by a more or less backlash between the inner circumferential end holding portion 13g and the holder portion 11c is transmitted to the bent portion 13e. Therefore, it is possible to prevent force from being applied to the bent portion 13e. Further, the bent portion 13e can be easily moved in a displacing direction of the cable 13 even when a displacement caused by a more or less backlash between the inside connector 15 and the connector holder portion 110a is transmitted to the bent portion 13e. Therefore, it is possible to prevent force from being applied to the bent portion 13e.

Further, since the hole 13i is formed in the inner circumferential end holding portion 13g, it is possible to easily inspect whether the inner circumferential end holding portion 13g is molded in a normal position of the cable 13 or not. Furthermore, since the engaging groove 13j is formed in the inner circumferential end holding portion 13g and the engaging projecting stripe 11d is formed in the holder portion 11c, it is possible to prevent the inner circumferential end holding portion 13g from being reversely inserted into the holder portion 11c.

Figure 4:
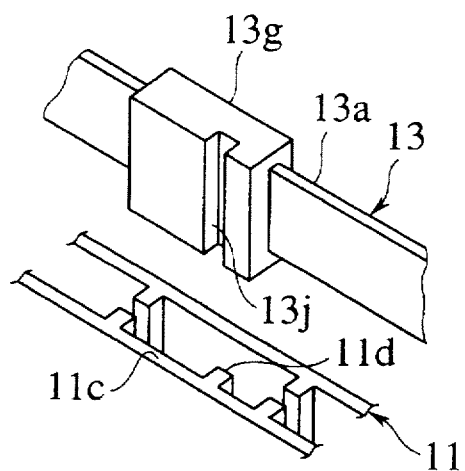
FIG. 4 is a main perspective view showing a first another example of the inner circumferential end holding portion in the relay device between the relative rotating members.

In the above embodiment form, the hole 13i is formed in the inner circumferential end holding portion 13g, but may not be formed as shown in FIG. 4.

Figure 5:
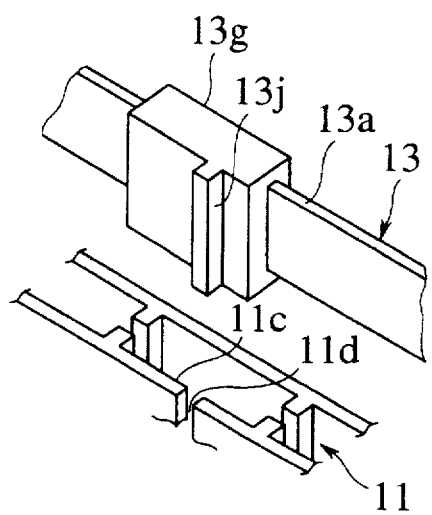
FIG. 5 is a main perspective view showing a second another example of the inner circumferential end holding portion in the relay device between the relative rotating members.

In the above embodiment form, the engaging groove 13j is formed in the inner circumferential end holding portion 13g and the engaging projecting stripe 11d is formed in the guide portion 11c. However, as shown in FIG. 5, an engaging projecting stripe 13j may be formed in the inner circumferential end holding portion 13g and an engaging groove 11d may be formed in the guide portion 11c.

Figure 6:
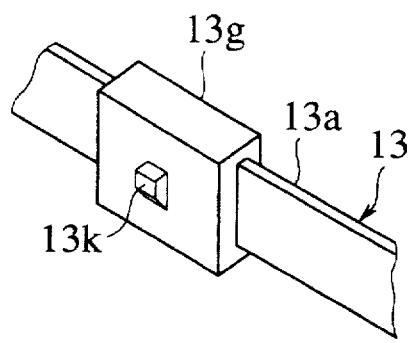
FIG. 6 is a main perspective view showing a third another example of the inner circumferential end holding portion in the relay device between the relative rotating members.
Figure 7:
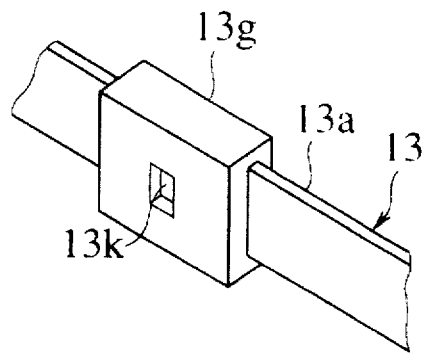
FIG. 7 is a main perspective view showing a fourth another example of the inner circumferential end holding portion in the relay device between the relative rotating members.

Further, as shown in FIG. 6, an engaging projection 13k may be formed in the inner circumferential end holding portion 13g and an unillustrated engaging recessed portion fitted to the engaging projection 13k may be formed in the holder portion 11c. In such a construction, no inner circumferential end holding portion 13g drops from the holder portion 11c if the inner circumferential end holding portion 13g is inserted into the holder portion 11c. Accordingly, there is a merit of facilitating a subsequent assembly work. As shown in FIG. 7, an engaging recessed portion 13k may be formed instead of the above engaging projection 13k in the inner circumferential end holding portion 13g, and an unillustrated engaging projection fitted to this engaging recessed portion 13k may be formed in the holder portion 11c.

The bent portions 13e and 13f are perpendicularly bent through a directional line of 45 degrees, but may be bent at another predetermined angle.

A second embodiment form of this invention will next be described with reference to FIGS. 8 and 9. Constructional elements common to those in the first embodiment form shown in FIGS. 1 to 3 are designated by the same reference numerals and an explanation thereof is omitted for brevity. This second embodiment form mainly differs from the first embodiment form in that a proximate portion of the bent portion 13f of the cable 13 is held by a guide member 12d. An outer circumferential end holding portion 13h and a holder portion 12e have constructions similar to those of the inner circumferential end holding portion 13g and the holder portion 11c shown in the first embodiment form and will be explained with reference to FIGS. 8 and 9.

Figure 8:
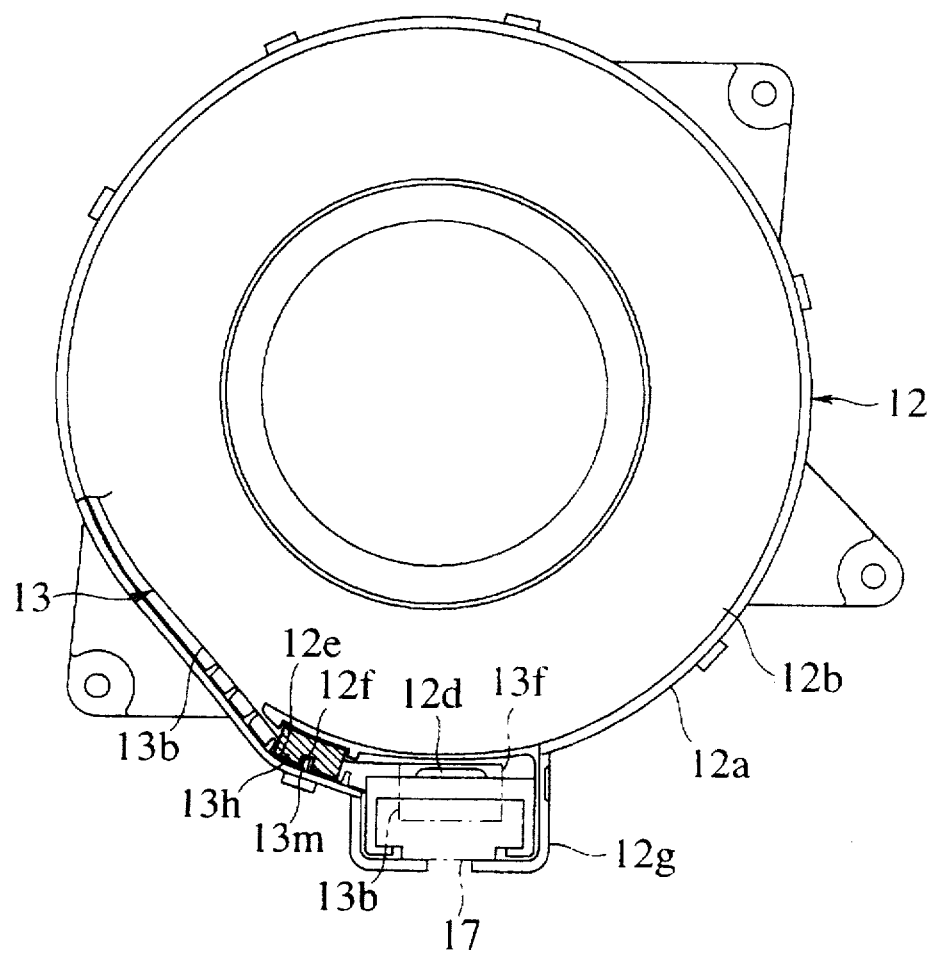
FIG. 8 is a plan view showing an outside cylindrical portion of a relay device between relative rotating members shown as a second embodiment form of this invention.

Namely, as shown in FIG. 8, the outer circumferential end holding portion 13h is formed by resin and attains a fixing state by insertion-molding in a portion near a central side from the bent portion 13f in the cable 13. An unillustrated hole similar to the hole 13i (see FIG. 3) shown in the first embodiment form is also formed in this outer circumferential end holding portion 13h. Further, an engaging groove 13m fitted to an engaging projecting stripe 12f of the holder portion 12e described later is formed in the outer circumferential end holding portion 13h.

The holder portion 12e for holding the outer circumferential end holding portion 13h is formed in an outside cylindrical portion (an outside sleeve-shaped member) 12a. This holder portion 12e holds the outer circumferential end holding portion 13h by inserting this outer circumferential end holding portion 13h in a direction perpendicular to a paper face of FIG. 8. Therefore, the holder portion 12e is approximately formed in the same shape as the outer circumferential end holding portion 13h so as not to cause any backlash. The engaging projecting stripe 12f is formed in the holder portion 12e and is fitted to the engaging groove 13m of the outer circumferential end holding portion 13h. This engaging projecting stripe 12f and the engaging groove 13m are arranged to prevent the outer circumferential end holding portion 13h from being reversely inserted into the holder portion 12e.

Figure 9:
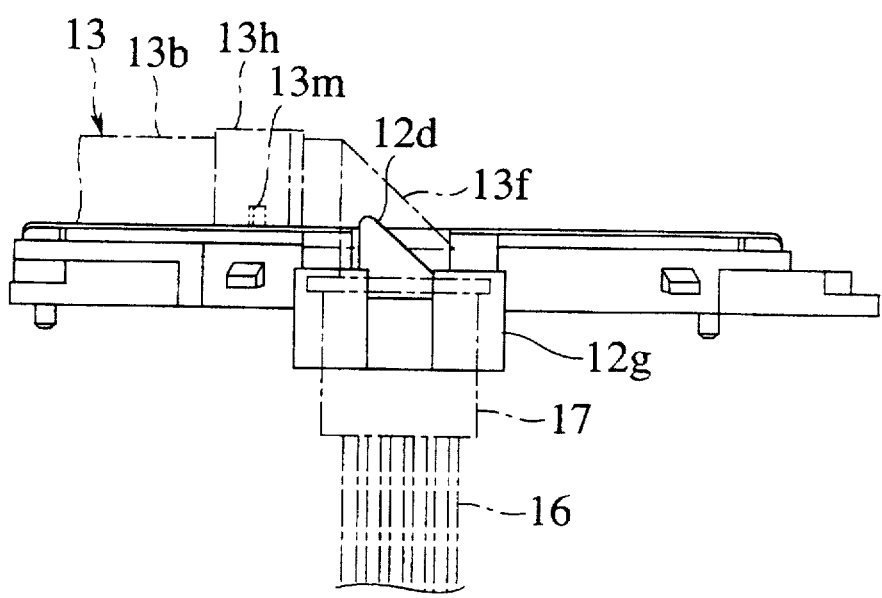
FIG. 9 is a side view showing an outside cylindrical portion of this relay device between the relative rotating members.

As shown in FIGS. 8 and 9, a guide member 12d is formed in the outside cylindrical portion 12a in a position adjacent to the holder portion 12e and holds a portion of the bent portion 13f prior to bending in the cable 13 on the side of a side wall of the outside cylindrical portion 12a. This guide member 12d is formed in a triangular shape having a slanting face inclined in a direction of 45 degrees along the bent portion 13f to sufficiently increase an amount overlapping the cable 13 and sufficiently increase the clearance between the guide member 12d and the bent portion 13f. A clearance capable of freely moving the cable 13 is formed between the guide member 12d and the side of the side wall of the outside cylindrical portion 12a.

Further, as shown in FIG. 9, a portion of an end tip side of the bent portion 13f in the cable 13 is connected to an external cable 16 through an outside connector 17. The outside connector 17 is fixed to a connector holder portion 12g formed in the outside cylindrical portion 12a.

The relay device 10 between relative rotating members constructed as above has the guide member 12d for holding a portion of the bent portion 13f prior to bending in the cable 13 on the side of a side wall of the outside cylindrical portion 12a. Accordingly, the cable 13 in the vicinity of the bent portion 13f can be stably held in a clearance portion between the guide member 12d and the side wall of the outside cylindrical portion 12a. The portion prior to bending can be easily moved along the side wall of the outside cylindrical portion 12a even when a displacement caused by a more or less backlash between the outer circumferential end holding portion 13h and the holder portion 12e is transmitted to the bent portion 13f. Therefore, it is possible to prevent force from being applied to the bent portion 13f. Further, if a displacement caused by a more or less backlash between the outside connector 17 and the connector holder portion 12g is transmitted to the bent portion 13f, a sufficient clearance is formed between the guide member 12d and the bent portion 13f so that the bent portion 13f is curvedly moved in a displacing direction of the cable 13. Accordingly, it is possible to prevent force from being applied to the bent portion 13f.

The outer circumferential end holding portion 13h shown in the above second embodiment form may be constructed like the inner circumferential end holding portion 13g shown in FIGS. 4 to 7.

Further, the nipping-supporting portion 11e shown in the first embodiment form may be formed instead of the guide member 12d. Similarly, the guide member 12d may be arranged instead of the nipping-supporting portion 11e in the first embodiment form.

Further, in each of the above embodiment forms, the inner circumferential end holding portion 13g and the outer circumferential end holding portion 13h are fixed to the cable 13 by insertion-molding. However, for example, a hollow box-shaped member or a block-shaped member may be fixed to the cable 13 such that this member nips the cable 13.

What is claimed is:

1. A relay device comprising:

an inside sleeve-shaped member and an outside sleeve-shaped member, said inside and outside sleeve-shaped members being rotatable relative to each other;

a flexible flat cable for electrically connecting said inside sleeve-shaped member with said outside sleeve-shaped member, said flexible flat cable having a longitudinal direction and being wound in a spiral shape and being arranged in an annular space defined between said inside sleeve-shaped member and said outside sleeve-shaped member; and a holding member in at least one of said inside and outside sleeve-shaped members, said holding member being capable of holding at least one end portion of said flexible flat cable in the longitudinal direction thereof;

wherein said flexible flat cable is bent at a bending portion having a predetermined angle with respect to the longitudinal direction so as to extend outward from one of said inside and outside sleeve-shaped members; and wherein said holding member is fixedly arranged on said flexible flat cable closer to a center portion thereof in the longitudinal direction from said bending portion.

2. The relay device as claimed in claim 1, wherein one of said inside and outside sleeve-shaped members has a nipping-supporting portion for nipping and holding overlapping portions of said flexible flat cable.

3. The relay device as claimed in claim 1, wherein one of said inside and outside sleeve-shaped members has a guide member for holding one of said overlapping portion constituting said bending portion, thereby guiding bending of said bending portion.

* * * * *